(12) United States Patent
Johnson

(10) Patent No.: US 7,424,805 B2
(45) Date of Patent: Sep. 16, 2008

(54) SUPERSONIC MISSILE TURBOJET ENGINE

(75) Inventor: James Edward Johnson, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 671 days.

(21) Appl. No.: 11/118,967

(22) Filed: Apr. 29, 2005

(65) Prior Publication Data
US 2006/0242943 A1 Nov. 2, 2006

(51) Int. Cl.
*F02K 3/10* (2006.01)

(52) U.S. Cl. .......................... 60/761; 60/262

(58) Field of Classification Search ........... 60/226.1, 60/761–766, 262, 770, 771, 39.281, 233, 60/228; 239/265.17; 244/53 R, 56, 3.22
See application file for complete search history.

(56) References Cited

U.S. PATENT DOCUMENTS

| | | | |
|---|---|---|---|
| 2,846,843 A | 8/1958 | Clark et al. | |
| 3,382,670 A | 5/1968 | Venable | |
| 3,396,800 A | 8/1968 | Hillander et al. | |
| 3,420,060 A | 1/1969 | Ostroff et al. | |
| 3,677,012 A | 7/1972 | Batscha | |
| 3,729,957 A | 5/1973 | Petrie et al. | |
| 3,779,007 A * | 12/1973 | Lavash | 60/39.281 |
| 3,826,586 A * | 7/1974 | Richards | 415/42 |
| 3,830,056 A | 8/1974 | Willis et al. | |
| 3,834,160 A * | 9/1974 | Moehring et al. | 60/243 |
| 3,938,328 A | 2/1976 | Klees | |
| 4,038,817 A * | 8/1977 | Snow et al. | 60/204 |
| 4,043,121 A | 8/1977 | Thomas et al. | |
| 4,052,847 A | 10/1977 | Rodgers et al. | |
| 4,054,030 A | 10/1977 | Pedersen | |
| 4,055,042 A | 10/1977 | Colley | |
| 4,060,981 A | 12/1977 | Hampton | |
| 4,064,692 A | 12/1977 | Johnson et al. | |
| 4,068,471 A | 1/1978 | Simmons | |
| 4,069,661 A * | 1/1978 | Rundell et al. | 60/204 |
| 4,072,008 A | 2/1978 | Kenworthy et al. | |
| 4,080,785 A * | 3/1978 | Koff et al. | 60/226.3 |
| 4,095,420 A * | 6/1978 | Abernethy et al. | 60/204 |
| 4,175,384 A * | 11/1979 | Wagenknecht et al. | 60/226.3 |

(Continued)

FOREIGN PATENT DOCUMENTS

GB 757818 A 9/1956

(Continued)

OTHER PUBLICATIONS

GE Aircraft Engines, "J93 Engine Cross Section," publicly available more than one year before Mar. 1, 2005, singe page.

(Continued)

*Primary Examiner*—William H Rodriguez
(74) *Attorney, Agent, or Firm*—William S. Andes; Francis L. Conte (57) ABSTRACT

A turbojet engine includes a core engine, an afterburner, and a converging-diverging exhaust nozzle in serial flow communication. A controller is operatively joined to the core engine and afterburner and configured for scheduling fuel thereto for operating the afterburner dry during subsonic flight operation of the engine, wet during transonic flight, and dry during supersonic flight.

20 Claims, 4 Drawing Sheets

U.S. PATENT DOCUMENTS

| | | | |
|---|---|---|---|
| 4,176,792 A | 12/1979 | McCardle, Jr. | |
| 4,232,515 A * | 11/1980 | Brown | 60/204 |
| 4,435,958 A * | 3/1984 | Klees | 60/204 |
| 4,551,971 A | 11/1985 | Suzuki | |
| 4,958,489 A | 9/1990 | Simmons | |
| 5,349,814 A | 9/1994 | Ciokajlo et al. | |
| 5,402,638 A | 4/1995 | Johnson | |
| 5,404,713 A * | 4/1995 | Johnson | 60/204 |
| 5,435,127 A * | 7/1995 | Luffy et al. | 60/204 |
| 5,806,303 A * | 9/1998 | Johnson | 60/262 |
| 5,809,772 A * | 9/1998 | Giffin et al. | 60/226.1 |
| 5,996,936 A * | 12/1999 | Mueller | 244/53 R |
| 6,112,513 A * | 9/2000 | Catt et al. | 60/204 |
| 6,336,319 B1 | 1/2002 | Koshoffer | |
| 6,487,847 B1 * | 12/2002 | Snow et al. | 60/235 |
| 6,895,741 B2 * | 5/2005 | Rago et al. | 60/226.1 |
| 7,013,636 B2 * | 3/2006 | Iya et al. | 60/204 |
| 7,185,485 B2 * | 3/2007 | Lewis | 60/243 |
| 7,216,475 B2 * | 5/2007 | Johnson | 60/226.1 |
| 2003/0074884 A1 * | 4/2003 | Snow et al. | 60/204 |
| 2003/0145577 A1 | 8/2003 | Hunter et al. | |
| 2005/0081509 A1 | 4/2005 | Johnson | |
| 2005/0284150 A1 | 12/2005 | Dittmar et al. | |
| 2006/0042252 A1 * | 3/2006 | Derouineau | 60/703 |
| 2007/0044476 A1 * | 3/2007 | Koshoffer | 60/776 |

FOREIGN PATENT DOCUMENTS

| | | | |
|---|---|---|---|
| GB | 822299 A | 10/1959 | |
| GB | 827744 A | 2/1960 | |
| GB | 921727 A | 3/1963 | |
| GB | 1069872 A | 5/1967 | |
| GB | 1273017 A | 5/1972 | |
| GB | 1452267 A | 10/1976 | |
| GB | 2054745 A | 2/1981 | |
| WO | WO 2004/022948 A1 | 3/2004 | |

OTHER PUBLICATIONS

Janes, "USA: Engines," Jane's All the World's Aircraft, 1986, pp. cover, 958, 959, 962, & 963.

www.fiddlegreen.net, "Raytheon Tomahawk B6M-109 Cruise Missile," Mar. 1, 2005, 5 pages, printed article only.

www.labiker.org, "001- Flight of the Valkyrie," Mar. 15, 2005, 17 pages, printed article only.

Johnson, U.S. Appl. No., concurrently filed Apr. 29, 2005, "Fladed Supersonic Missile Turbojet,".

Johnson, U.S. Appl. No., concurrently filed Apr. 29, 2005, "Thrust Vectoring Missile Turbojet,".

Johnson, U.S. Appl. No., concurrently filed Apr. 29, 2005, "Self Powered Missile Turbojet,".

Johnson, U.S. Appl. No. 11/118,698, concurrelty filed Apr. 29, 2005, "Fladed Supersonic Missle Turbojet,".

Johnson, U.S. Appl. No. 11/118,171, concurrently filed Apr. 29, 2005, "Thrust Vectoring Missile Turbojet,".

Johnson, U.S. Appl. No. 11/118,966, concurrently filed Apr. 29, 2005, "Self Powered Missile Turbojet,".

* cited by examiner

SUPERSONIC MISSILE TURBOJET ENGINE

BACKGROUND OF THE INVENTION

The present invention relates generally to gas turbine engines, and, more specifically, to supersonic missile engines.

Typical commercial and military aircraft are powered by multi-rotor turbofan gas turbine engines. A forward fan is powered by a low pressure turbine (LPT). A multistage axial compressor follows the fan and is powered by a multistage high pressure turbine (HPT).

An annular combustor is located between the compressor and the HPT for mixing fuel with the pressurized air and generating hot combustion gases from which energy is extracted by the HPT and LPT during operation. The rotor blades of the two turbines are joined to corresponding rotor shafts or spools to the rotor blades of the fan and the compressor.

The turbofan engine is sized for producing near maximum propulsion thrust during takeoff operation of the aircraft being powered thereby during which maximum airflow or mass flow is achieved in the engine at a correspondingly high rotor speed of the HPT and compressor, and a lower speed for the LPT and fan.

In order to provide additional propulsion thrust for military aircraft, and typically for supersonic operation thereof, an augmentor or afterburner may be introduced following the turbofan core engine. The typical afterburner includes an annular combustion liner, with a plurality of fuel spray bars and V-gutter flameholders at the forward end thereof. An articulated converging-diverging (CD) nozzle is disposed at the aft end of the afterburner for discharging the combustion exhaust gases during operation.

The CD exhaust nozzle is typically formed of a row of primary exhaust flaps which converge in the downstream direction to a throat of minimum flow area from which a row of secondary exhaust flaps diverge to the nozzle outlet for providing controlled diffusion of the exhaust flow being discharged. A suitable drive train, including one or more actuators and linkages, controls the kinematic motion of the exhaust flaps in accordance with predetermined schedules for the converging and diverging slopes of the flaps and the flow area at the throat therebetween.

During subsonic operation of the aircraft below Mach 1 when the afterburner is operated dry without fuel flow through the spray bars thereof, the nozzle throat has a minimum flow area for maximizing performance of the core engine.

During wet operation of the afterburner when fuel flow is scheduled through the spray bars, the fuel is mixed with the spent combustion gases from the core engine and ignited to re-energize the combustion gases and provide additional propulsion thrust from the engine.

Full-time operation of the afterburner permits transonic and supersonic operation of the aircraft above Mach 1 which requires the increased propulsion thrust from the engine. And during wet operation, the CD nozzle is scheduled to increase the flow area of the throat for accommodating the increased mass flow of the combustion gases discharged therethrough for maintaining efficiency and performance of the engine during supersonic flight.

Whereas gas turbine engines specifically configured for powering aircraft in flight are relatively complex for the required safety of operation for carrying people in flight over an extended number of flight cycles, gas turbine engines for missile applications may be considerably simpler in configuration, and smaller in size, and specifically configured for single flight applications for reaching the intended military target, without the need to carry people.

Various forms of turbojet and turbofan gas turbine engines are known for powering military missiles typically at subsonic flight speeds. The engines are configured as simply as possible and as small as possible for producing the required propulsion thrust for the intended flight range.

Air breathing missiles, like their counterpart manned aircraft, require a suitable inlet for channeling ambient air to the engine. The engine includes a suitable compressor for pressurizing the air which is then mixed with fuel in a combustor for generating hot combustion gases. Energy is extracted from the combustion gases in variously configured turbines for producing propulsion thrust to power the missile.

Since currently known missiles have subsonic flight limits, afterburners and the associated increase in size and complexity are avoided in such missiles.

However, supersonic flight, air breathing missile systems can provide corresponding advantages for military applications and are the next progression in the development of missile systems. In particular, air breathing missile systems in the Mach 3.0-3.5 class require substantial propulsion thrust capability from subsonic, through transonic, and to the maximum supersonic flight speeds required. Since weight is a paramount design objective for all flying systems, supersonic missiles should maximize payload capability while minimizing missile size, weight, and cost, which are competing objectives.

The gas turbine engine designed for a supersonic missile system fundamentally affects the entire configuration of the missile and its payload capability and flight range. A suitable engine should have minimum engine size and provide balanced thrust production at key transonic and supersonic flight conditions.

The engine design should simplify the design requirements of the Mach 3.0-3.5 class air inlet for the missile. Correspondingly, the engine design should simplify the exhaust system for the Mach 3.0-3.5 missile.

The engine design should address the mitigation of air vehicle, or missile, and engine installation losses. The installed engine may further include thrust vectoring capabilities but should be integrated in an efficient manner.

Since the engine must produce electrical power in addition to propulsion thrust during operation, the engine design as integrated in the missile should also include improved power generation and power supply capabilities therein. The typical engine control and accessories should be minimized in size and packaging for effecting a compact missile system.

Since the engine generates considerable heat during operation, and the missile will fly at substantially maximum flight speed over its intended flight range, critical thermal management issues must also be addressed in the engine design for achieving reliable operation of the missile to its intended target.

And, the many and varied competing design factors in a supersonic class air breathing missile must also be addressed for providing minimum weight of the missile and engine system, minimum size, maximum performance and reliability, all with the minimum cost of production specific to the propulsion engine itself.

Accordingly, it is desired to provide an improved gas turbine engine for a supersonic missile application.

BRIEF DESCRIPTION OF THE INVENTION

A turbojet engine includes a core engine, an afterburner, and a converging-diverging exhaust nozzle in serial flow communication. A controller is operatively joined to the core engine and afterburner and configured for scheduling fuel thereto for operating the afterburner dry during subsonic flight operation of the engine, wet during transonic flight, and dry during supersonic flight.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
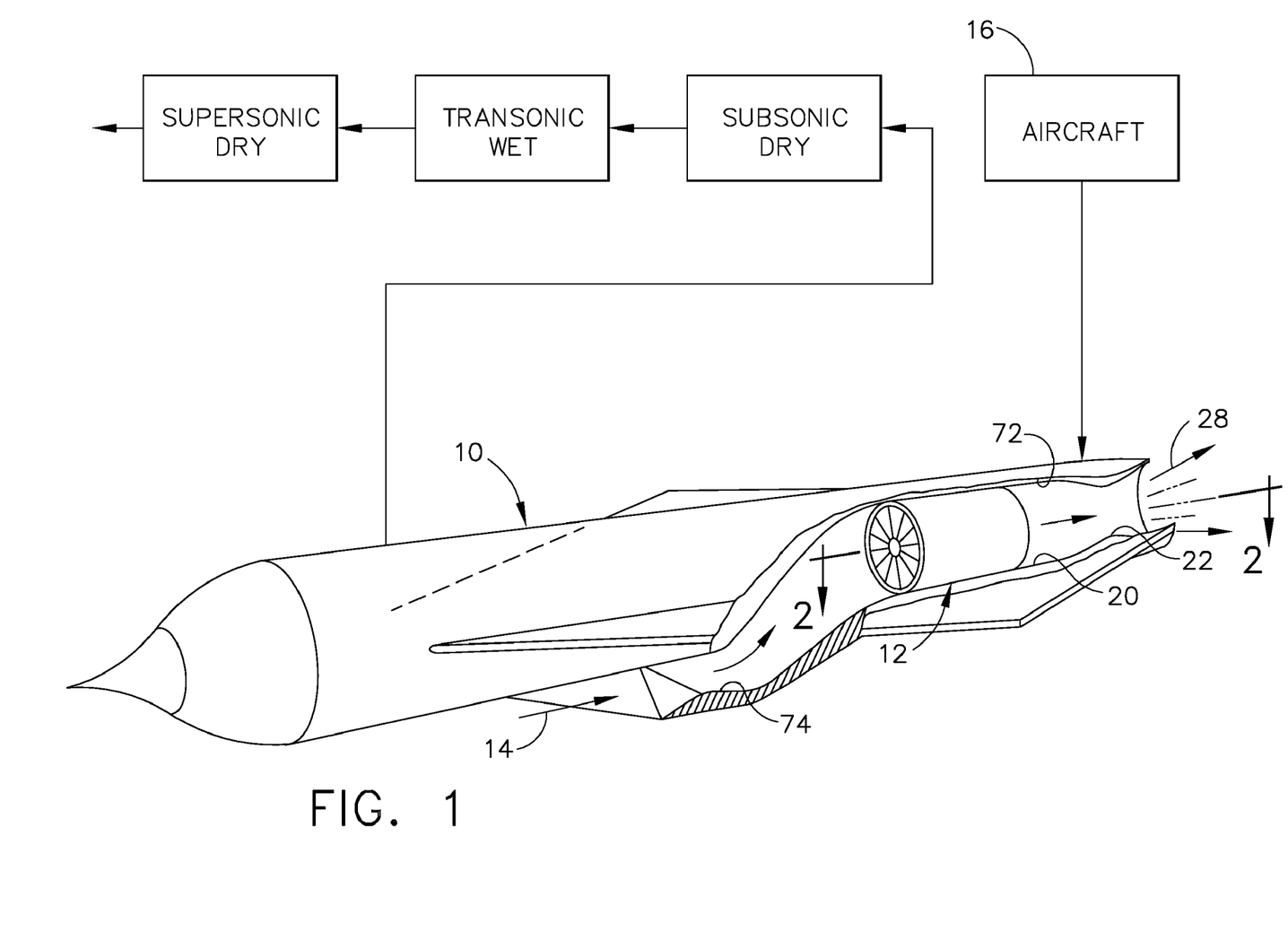
FIG. 1 is a partly schematic isometric view of an exemplary supersonic missile powered by a turbojet gas turbine engine.

Illustrated in FIG. 1 is an exemplary supersonic missile 10 powered by a turbojet gas turbine engine 12 suitably mounted inside the aft end thereof. The missile 10 itself may have any suitable configuration and size for flight operation from subsonic, through transonic, and into supersonic flight speeds in the class of Mach 3.0-3.5.

The missile is air breathing and ingests ambient air 14 during operation which is compressed inside the turbojet engine 12 for producing all of the propulsion thrust required for subsonic through supersonic operation of the missile.

In a typical application, the missile 10 is sized and configured for being carried to high altitude by a corresponding military aircraft 16 which will launch the missile at altitude for subsequent travel to the intended target. The missile is released from the aircraft and powered by the turbojet engine which is operated in turn for accelerating the missile from subsonic speed when released from the aircraft, through transonic speed and into the intended supersonic Mach 3.0-3.5 maximum speed thereof.

Figure 2:
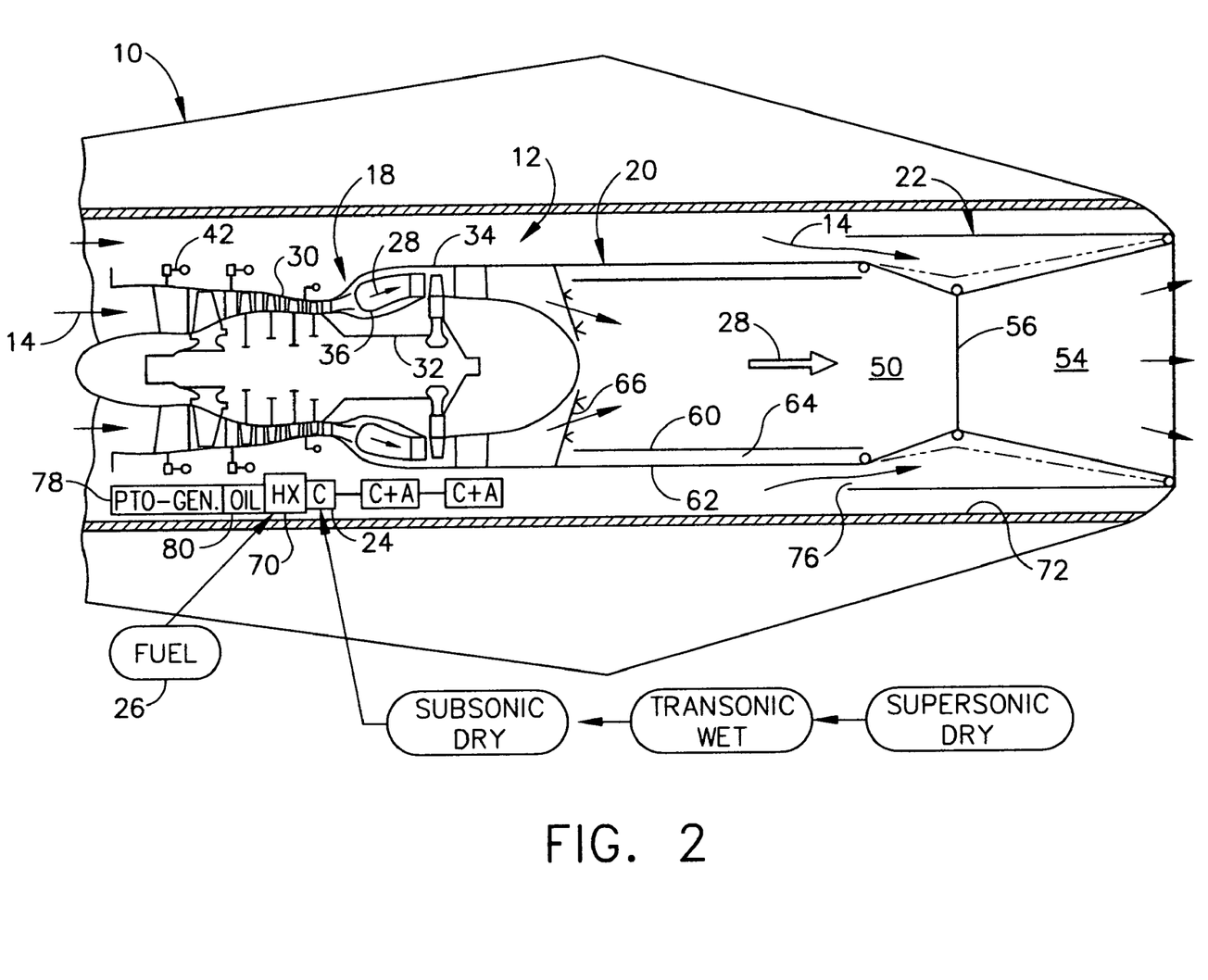
FIG. 2 is an enlarged axial sectional view of the turbojet engine illustrated in FIG. 1 and taken along line 2-2.

The turbojet engine 12 is illustrated in more detail in FIG. 2 and includes a core engine 18, an augmentor or afterburner 20, and a converging-diverging (CD) exhaust nozzle 22 disposed in serial flow communication coaxially along a longitudinal or axial centerline axis extending longitudinally through the engine and surrounding missile.

The engine also includes a suitable controller 24, such as a conventional digitally programmable computer, which is operatively joined to the core engine 18, afterburner 20, and exhaust nozzle 22 for controlling and coordinating operation thereof. The controller is suitably configured, in software for example, for scheduling fuel 26 to the core engine and afterburner which is mixed with the incoming air 14 for generating hot combustion gases 28 during operation.

In particular, the controller 24 provides means for scheduling fuel to the afterburner in a predetermined schedule for operating the afterburner dry without additional fuel injected therein during subsonic flight of the engine and missile, operating the afterburner wet with additional fuel injected therein during transonic flight operation of the missile, and again operating the afterburner dry without additional fuel injected therein during supersonic flight of the missile in turn as the engine accelerates the missile in speed from its initial subsonic speed below Mach 1 to the intended maximum supersonic speed, such as the Mach 3.0 to 3.5 maximum flight speed desired.

The controller therefore has the technical effect of operating the engine components to achieve the necessary propulsion thrust for subsonic, transonic, and supersonic flight operation of the missile powered by the engine.

Figure 3:
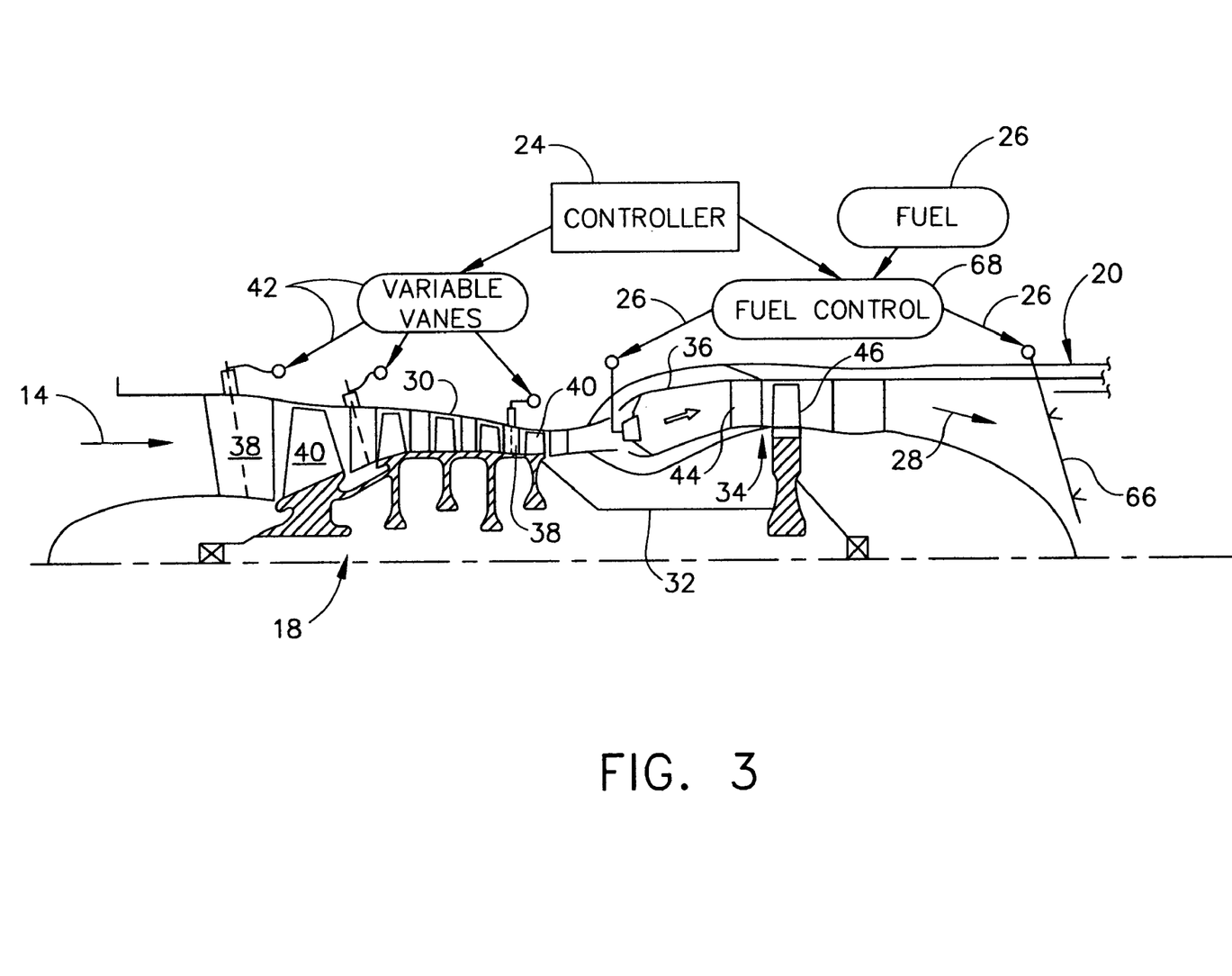
FIG. 3 is an enlarged axial sectional view of a portion of the core engine and forward end of the afterburner illustrated in FIG. 2.

The core engine 18 is illustrated in more detail in FIG. 3 and includes a multistage axial compressor 30 which pressurizes the ambient air 14 received from outside the missile. The compressor 30 is joined by a shaft or rotor 32 to a high pressure turbine (HPT) 34 disposed downstream therefrom.

An annular combustor 36 is disposed between the compressor and HPT and receives the pressurized air from the compressor which is then mixed with fuel in the combustor for generating the hot combustion gases 28 that are discharged through the turbine which extracts energy therefrom to in turn power the compressor.

In order to keep the engine compact and lightweight, the compressor is configured with a minimum number of compression stages, and the turbine 34 is preferably configured with a single stage to drive all of the compressor stages. The engine is further characterized by the absence of the typical low pressure turbine (LPT), and corresponding absence of an upstream fan joined to the LPT by a corresponding second rotor shaft.

Accordingly, the core engine 18 itself, without a fan and LPT, provides all required propulsion thrust for propelling the missile and its payload during both dry subsonic flight, as well as dry supersonic flight.

For transonic flight operation between subsonic and supersonic flight speeds, the afterburner is operated wet with additional fuel being injected therein for re-energizing the combustion gases and providing the additional propulsion thrust for powering the missile through the portion of the flight envelope in which the sound barrier is broken. The afterburner should be operated wet only as required for the specific missile propulsion requirements of the flight envelope to minimize fuel consumption.

For example, transonic wet operation may occur in the exemplary range of Mach 0.8 to about Mach 2.0. Above Mach 2.0 operation, the afterburner is operated dry to conserve fuel and maximize missile flight range. And, if required, the afterburner may again be operated wet, for example greater than about Mach 3.0, to meet the higher propulsion thrust requirements of the missile in this portion of the flight envelope.

An exemplary configuration of the compressor 30 is illustrated in FIG. 3 and includes sequential stages or rows of cooperating stator vanes 38 extending radially inwardly from a supporting stator casing, and corresponding rows of rotor or compressor blades 40 extending radially outwardly from corresponding supporting disks joined to the rotor 32. The first two and last stages of the compressor vanes 38 are variable, with each variable vane being rotatable around a radial axis thereof for varying the flow area and direction of the intervane flow passages during operation. Each row of variable vanes 38 includes a corresponding drive train 42 for simultaneously rotating each of the vanes in unison.

Variable stator vanes in axial compressors are conventionally known along with their corresponding actuation or drive trains 42 which include corresponding levers, unison rings, and actuators for adjusting the rotary position of the vanes in each row. The corresponding drive trains 42 for the variable vanes are in turn operatively joined to the engine controller 24 which controls the precise rotary position of the various variable vane stages for maintaining suitable stall margin of the compressor during the entire flight envelope as well as maximizing efficiency of the compressor.

Conventional axial compressors in modem turbojet or turbofan aircraft engines typically include multiple stages of variable stator vanes at the forward end of the compressor with the last several stages of stator vanes being fixed, and not variable. In contrast, the turbojet engine illustrated in FIG. 3 additionally introduces variable stator rear vanes 38 in the last compressor stage for effecting different positions corresponding with subsonic dry operation and supersonic dry operation in particular.

All of the variable stator vanes in the compressor are suitably scheduled for corresponding rotary positions thereof for maintaining adequate stall margin of the compressor during the entire flight envelope of the missile.

However, the rotary position of the last stage compressor vanes is suitably scheduled in the controller 24 to limit the physical rotational speed of the rotor 32 during dry supersonic flight requiring maximum airflow through the compressor, with that rotor speed being limited to about the physical rotary speed of the rotor 32 during dry subsonic flight requiring correspondingly less airflow through the compressor.

In the exemplary configuration illustrated in FIG. 3, the compressor 30 includes only five stages of the compressor vanes 38 and corresponding compressor blades 40, with five rows each thereof, with the compressor blades 40 being joined by the single rotor 32 to the single turbine 34 having a single stage. The single stage turbine 34 includes a single row of turbine nozzle vanes 44 defining the high pressure turbine nozzle at the discharge end of the combustor.

The nozzle vanes 44 direct the combustion gases into a single row of high pressure turbine rotor blades 46 extending radially outwardly from a supporting rotor disk, which in turn is joined to the rotor 32. The single stage of turbine blades 46 drives all five stages of compressor rotor blades 40 through the common rotor 32.

The single-rotor afterburning turbojet engine illustrated in FIG. 2 provides substantial benefits for the Mach 3.0-3.5 class air breathing missile. Balanced thrust production can be achieved by incorporating the afterburner 20 for transonic propulsion thrust needs while providing the desired dry Mach 3.0-3.5 propulsion thrust levels by suitable scheduling of the airflow through the engine and turbine inlet temperature.

The specific introduction of the last-stage rear variable stator vanes in the compressor 30 permits tailoring of the compressor map flow-speed characteristic through the engine to limit operating physical speeds at Mach 3.0-3.5 to about the same levels of rotor speed at sea level static values. This allows a relatively high corrected speed to be used in the design of the compressor which in turn minimizes the number of stages and resulting cost of the high specific flow, low radius ratio compression system. Furthermore, the accompanying high physical rotary speed of the rotor 32 minimizes diameter of the high pressure turbine 34 for a given turbine aerodynamic loading, keeping the maximum envelope diameter of the engine as small as possible.

Figure 4:
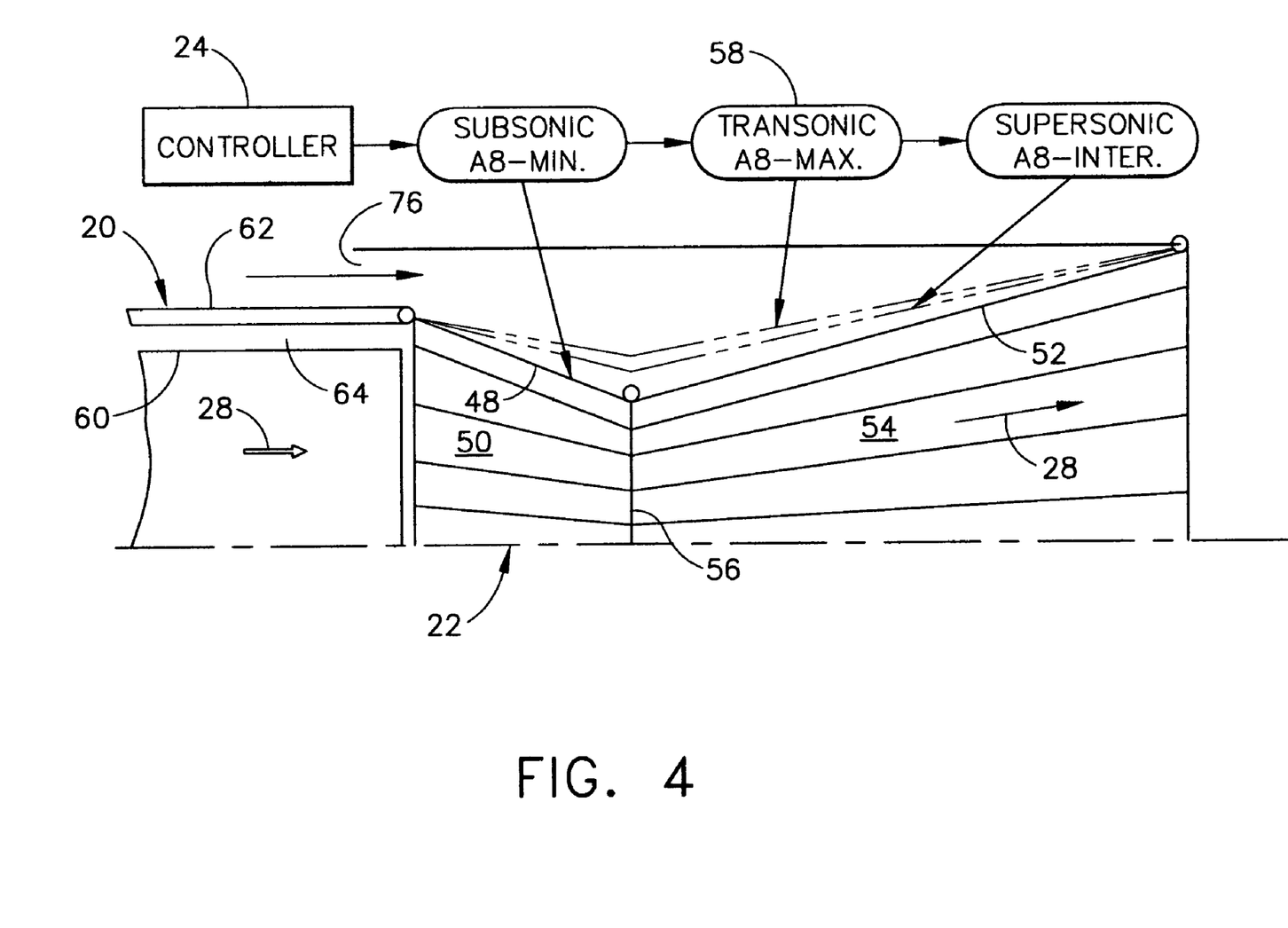
FIG. 4 is an enlarged isometric view of a portion of the exhaust nozzle and aft end of the afterburner illustrated in FIG. 2.

The exhaust nozzle 22 is illustrated in more detail in FIG. 4 in an exemplary embodiment. The nozzle may include a plurality of articulated primary flaps 48 defining a converging inlet duct 50. A plurality of articulated or pivotable secondary flaps 52 are disposed downstream therefrom to define a diverging outlet duct 54. The inlet duct 50 converges aft in flow area to a throat 56 of minimum flow area, and the outlet duct 54 diverges aft therefrom for diffusing the combustion gases 28 discharged from the nozzle during operation.

The primary and secondary flaps 48,52 are operatively joined to a suitable drive train 58 including linkages and one or more actuators for varying slope of the flaps in their converging and diverging inclines, while also varying flow area (typically designated A8) at the throat 56. The controller 24 is configured with suitable software for scheduling the desired flow area of the throat 56 and the corresponding inclinations of the converging and diverging ducts 50,54 for cooperating with the core engine during operation.

For example, the controller 24 is specifically configured for adjusting the exhaust nozzle 22 for varying flow area of the throat 56 for minimum flow area during dry subsonic flight of the missile, and with maximum flow area during wet transonic flight of the missile, and with an intermediate flow area between the minimum and maximum flow areas during the dry or wet supersonic flight of the missile all of which require different mass flow rates of the compressed air and combustion gases channeled through the turbojet engine during operation.

Unlike a typical augmented aircraft engine in which the afterburner thereof must be operated full time during supersonic flight in excess of Mach 2, the afterburner 22 in the turbojet engine illustrated in FIG. 4 is operated wet solely or primarily in the transonic portion of the flight envelope, while being operated dry both in the slower subsonic portion and the faster supersonic portion of the flight envelope. Correspondingly, the rear variable stator vanes of the compressor 30 illustrated in FIG. 3 are coordinated with increasing flight speed, and with operation of the afterburner, to prevent excessive speed of the rotor 32 while still providing the maximum mass flow rate through the turbojet engine required for efficient propulsion thrust in the Mach 3.0-3.5 flight envelope.

The CD exhaust nozzle 22 illustrated in FIG. 4 may have any conventional configuration such as that found in military aircraft suitably sized for the substantially smaller application thereof in the supersonic missile. The nozzle may be circular in cross section or rectangular in accordance with conventional aircraft practice and should be simplified as much as possible for the disposable application of the turbojet engine in the missile.

Other embodiments of the CD exhaust nozzle may be used for further simplifying the features thereof while providing the desired converging and diverging exhaust ducts with the intermediate throat therebetween for matching operation of the core engine for the subsonic, transonic, and supersonic flight regimes.

Similarly, the afterburner 20 illustrated in FIG. 2 may itself have a conventional configuration derived from corresponding augmented aircraft engines but sized sufficiently small for the small missile application. The afterburner 20 may include a tubular combustion liner 60 mounted concentrically inside a surrounding annular casing 62 to define an annular bypass duct 64 radially therebetween.

The inlet end of the afterburner liner 60 receives the spent combustion gases 28 from the core engine, a portion of which may be diverted through the bypass duct 64 for cooling the afterburner liner during operation.

A plurality of conventional fuel spray bars 66, with conventional V-gutter flameholders attached thereto, extend radially inwardly from the afterburner casing 62 at the forward end of the afterburner liner 60. As shown in FIG. 3, the fuel spray bars 66 are operatively joined to the engine controller 24 through a corresponding fuel controller 68 for scheduling fuel flow to the spray bars of the afterburner during operation. The fuel controller 68 is also effective for scheduling fuel flow to the corresponding fuel injectors for the combustor 36 of the core engine, with discrete fuel controllers being preferred.

In this way, the engine controller 24 controls operation of both the main combustor 36 in the core engine and the afterburner combustor through the corresponding fuel injectors therefor, with the fuel being scheduled thereto in accordance with the subsonic, transonic, and supersonic flight requirements of the turbojet engine.

The in-line configuration of the core engine 18, afterburner 20, and exhaust nozzle 22 illustrated in FIG. 2, along with its attendant simplicity by the elimination of a low pressure turbine using a single-stage high pressure turbine and limited-stage compressor cooperate to provide a relatively small diameter and compact turbojet engine which is readily installed in the aft end of the missile. This in turn will ensure a small size for the missile, including a relatively small diameter thereof.

Furthermore, the various associated controls and accessories required for operating the turbojet engine may be distributed and integrated around the external casing of the engine for further minimizing its outer diameter. For example, a heat exchanger 70 of conventional configuration may be mounted in the engine in the available space around the core engine adjoining the controller 24. The heat exchanger includes a flow circuit for initially channeling the relatively cool fuel from its supply tank through the heat exchanger for in turn cooling by conduction the controller 24 and the electronic components thereof.

The controller 24 itself as illustrated schematically in FIG. 2 may be distributed in discrete and separated modules, such as the three modules illustrated in FIG. 2, around the envelope surrounding the external casing of the core engine for further minimizing diameter or size of the engine in the missile application.

As shown in FIGS. 1 and 2, the turbojet engine 12 is integrated or mounted inside the aft end of the missile 10 in a corresponding tubular engine bay 72 provided therefor. The turbojet engine 12 illustrated in FIG. 1 further includes an inlet air duct 74 extending forward from the core engine thereof in axial alignment therewith, with the inlet duct extending forwardly through the side of the missile body or casing for receiving ambient air during subsonic to supersonic operation.

The external portion of the inlet 74 should be suitably configured for efficiently receiving ambient air 14 under ram pressure as the missile is operated from subsonic through supersonic operation. In supersonic operation, shock waves will be generated in the entrance to the inlet duct for channeling subsonic inlet air into the core engine.

As illustrated in FIG. 2, some of the inlet air 14 to the core engine may be diverted around the external case thereof and channeled through the engine bay 72 to the exhaust nozzle. This engine bay air may be used for cooling the external case of the afterburner, and is then channeled through an ejector inlet 76 around the forward end of the exhaust nozzle for cooling the nozzle secondary flaps 52. The spent cooling air is then discharged at the nozzle outlet.

The compact installation of the turbojet engine inside the engine bay 72 is best illustrated in FIG. 2. In order to further minimize the outer diameter of the turbojet engine, the conventional power takeoff module and electrical generator 78 and oil sump 80 are also distributed axially along the core engine within the common external envelope along with the distributed controller modules 24. The various controls and accessories (C+A) modules may therefore be conveniently distributed in the available space closely around the external casing of the engine for minimizing its installation size inside the missile.

The resulting afterburning turbojet engine disclosed above is relatively small and compact and can lead to a low cost, effective propulsion solution for a volume limited, dimensionally constrained missile propulsion system. The turbojet engine results in minimum engine size while providing balanced thrust production at key transonic and supersonic flight conditions. The control and accessory modules are conveniently distributed around the engine for maintaining the outer diameter thereof relatively small.

Thermal management issues in the turbojet engine are conveniently addressed by its relatively small size and coordinated operation with the rear-variable compressor and afterburner operation cooled by the ram air received through the engine and also distributed around the engine bay. And, the relative simplicity of the afterburning turbojet engine will correspondingly reduce the production cost thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claimed:

The invention claimed is:

1. A supersonic turbojet engine comprising:
   a core engine including a multistage axial compressor joined by a rotor to a single-stage high pressure turbine, with an annular combustor disposed therebetween;
   an afterburner disposed coaxially with an aft end of said core engine for receiving combustion gases therefrom;
   a converging-diverging exhaust nozzle disposed coaxially with an aft end of said afterburner for discharging said combustion gases; and
   a controller operatively joined to said core engine and afterburner and configured for scheduling fuel thereto in a predetermined schedule for operating said afterburner dry during subsonic flight of said turbojet engine, wet during transonic flight, and dry during supersonic flight.

2. An engine according to claim 1 wherein:
   said compressor includes a row of variable stator rear vanes in the last stage thereof, and a drive train for simultaneously rotating each of said rear vanes; and
   said controller is operatively joined to said drive train, and is further configured for scheduling rotary position of said vanes to limit speed of said rotor during dry supersonic flight requiring maximum airflow through said compressor to about the speed of said rotor during dry subsonic flight requiring correspondingly less airflow through said compressor.

3. An engine according to claim 2 wherein:
   said exhaust nozzle includes an inlet duct converging aft to a throat of minimum flow area, and an outlet duct diverging aft therefrom for diffusing said combustion gases discharged therefrom; and
   said controller is operatively joined to said exhaust nozzle, and is further configured for varying flow area of said throat to minimum area during said dry subsonic flight, maximum area during said wet transonic flight, and intermediate area during said dry supersonic flight.

4. An engine according to claim 3 wherein said compressor further comprises sequential stages of cooperating stator vanes and rotor blades terminating in said variable rear vanes and a cooperating row of last stage rotor blades joined to said rotor, and the first two stages of said vanes are variable and operatively joined by corresponding drive trains to said controller for scheduling rotary position thereof.

5. An engine according to claim 4 wherein said compressor comprises only five stages of said vanes and corresponding blades joined by a common rotor to said turbine having a single row of turbine blades.

6. An engine according to claim 4 wherein said afterburner comprises:
   a tubular combustion liner mounted concentrically inside an annular casing to define a bypass duct therebetween for receiving said combustion gases from said core engine; and
   a plurality of fuel spray bars extending radially inwardly at a forward end of said liner and operatively joined to said controller for scheduling fuel flow to said afterburner during operation.

7. An engine according to claim 4 wherein said exhaust nozzle further comprises:
   a plurality of articulated primary flaps defining said inlet duct, and a plurality of articulated secondary flaps defining said outlet duct; and
   a drive train operatively joined to said primary and secondary flaps for varying slope thereof and flow area at said throat, and operatively joined to said controller for scheduling said flow area.

8. An engine according to claim 4 further comprising a heat exchanger adjoining said controller and including a flow circuit to initially channel said fuel therethrough for cooling said controller.

9. An engine according to claim 4 wherein:
   said controller is distributed in discrete and separated modules around the surrounding envelope of said core engine for minimizing size thereof;
   said afterburner comprises:
      a tubular combustion liner mounted concentrically inside an annular casing to define a bypass duct therebetween for receiving said combustion gases from said core engine; and
      a plurality of fuel spray bars extending radially inwardly at a forward end of said liner and operatively joined to said controller for scheduling fuel flow to said afterburner during operation;
   said exhaust nozzle further comprises:
      a plurality of articulated primary flaps defining said inlet duct, and a plurality of articulated secondary flaps defining said outlet duct; and
      a drive train operatively joined to said primary and secondary flaps for varying slope thereof and flow area at said throat, and operatively joined to said controller for scheduling said flow area; and further comprising:
   a heat exchanger adjoining said controller and including a flow circuit to initially channel said fuel therethrough for cooling said controller.

10. An engine according to claim 9 mounted inside a surrounding tubular engine bay and further including:
   a power takeoff module and oil sump distributed axially along said core engine with said distributed controller modules for minimizing diameter of said bay; and
   said exhaust nozzle includes an ejector inlet at a forward end for ejector cooling said secondary flaps.

11. A turbojet engine for powering a supersonic missile comprising:

a core engine including a multistage axial compressor joined by a rotor to a high pressure turbine, with an annular combustor disposed therebetween;
   an afterburner disposed coaxially with an aft end of said core engine for receiving combustion gases therefrom;
   a converging-diverging exhaust nozzle disposed coaxially with an aft end of said afterburner for discharging said combustion gases; and
   a controller operatively joined to said core engine and afterburner and configured for scheduling fuel thereto in a predetermined schedule for operating said afterburner dry during subsonic flight of said missile, wet during transonic flight, and dry during supersonic flight.

12. A turbojet engine for powering a supersonic missile comprising:
   a core engine including a multistage axial compressor joined by a rotor to a high pressure turbine, with an annular combustor disposed therebetween, and said compressor includes a row of variable stator rear vanes in the last stage thereof;
   an afterburner disposed coaxially with an aft end of said core engine for receiving combustion gases therefrom;
   a converging-diverging exhaust nozzle disposed coaxially with an aft end of said afterburner for discharging said combustion gases;
   a controller operatively joined to said core engine and afterburner and configured for scheduling fuel thereto for operating said afterburner dry during subsonic flight of said missile, wet during transonic flight, and dry during supersonic flight; and
   said controller is operatively joined to said rear vanes, and is further configured for scheduling rotary position of said vanes to limit speed of said rotor during dry supersonic flight requiring maximum airflow through said compressor to about the speed of said rotor during dry subsonic flight requiring correspondingly less airflow through said compressor.

13. An engine according to claim 12 wherein:
   said exhaust nozzle includes an inlet duct converging aft to a throat of minimum flow area, and an outlet duct diverging aft therefrom for diffusing said combustion gases discharged therefrom; and
   said controller is operatively joined to said exhaust nozzle, and is further configured for varying flow area of said throat to minimum area during said dry subsonic flight, maximum area during said wet transonic flight, and intermediate area during said dry supersonic flight.

14. An engine according to claim 13 wherein said compressor further comprises sequential stages of cooperating stator vanes and rotor blades terminating in said variable rear vanes and a cooperating row of last stage rotor blades joined to said rotor, and the first two stages of said vanes are variable and operatively joined to said controller for scheduling rotary position thereof.

15. An engine according to claim 14 wherein said compressor comprises only five stages of said vanes and corresponding blades joined by said rotor to said turbine having a single stage.

16. An engine according to claim 14 wherein said afterburner comprises:
   a tubular combustion liner mounted concentrically inside an annular casing to define a bypass duct therebetween for receiving said combustion gases from said core engine; and a plurality of fuel spray bars extending radially inwardly at a forward end of said liner and operatively joined to said controller for scheduling fuel flow to said afterburner during operation.

17. An engine according to claim 14 wherein said exhaust nozzle further comprises:
a plurality of articulated primary flaps defining said inlet duct, and a plurality of articulated secondary flaps defining said outlet duct; and a drive train operatively joined to said primary and secondary flaps for varying slope thereof and flow area at said throat, and operatively joined to said controller for scheduling said flow area.

18. An engine according to claim 14 further comprising a heat exchanger adjoining said controller and including a flow circuit to initially channel said fuel therethrough for cooling said controller.

19. An engine according to claim 14 wherein said controller is distributed in discrete and separated modules around the surrounding envelope of said core engine for minimizing size thereof.

20. An engine according to claim 19 in combination with said supersonic missile and mounted inside an engine bay at an aft end thereof, and said turbojet engine further includes an inlet duct extending forward from said core engine and forwardly through the side of said missile for receiving ambient air during subsonic to supersonic operation.

* * * * *